Nov. 13, 1928.
P. B. REEVES
1,691,892
TRANSMISSION BELT
Filed March 5, 1926   2 Sheets-Sheet 1
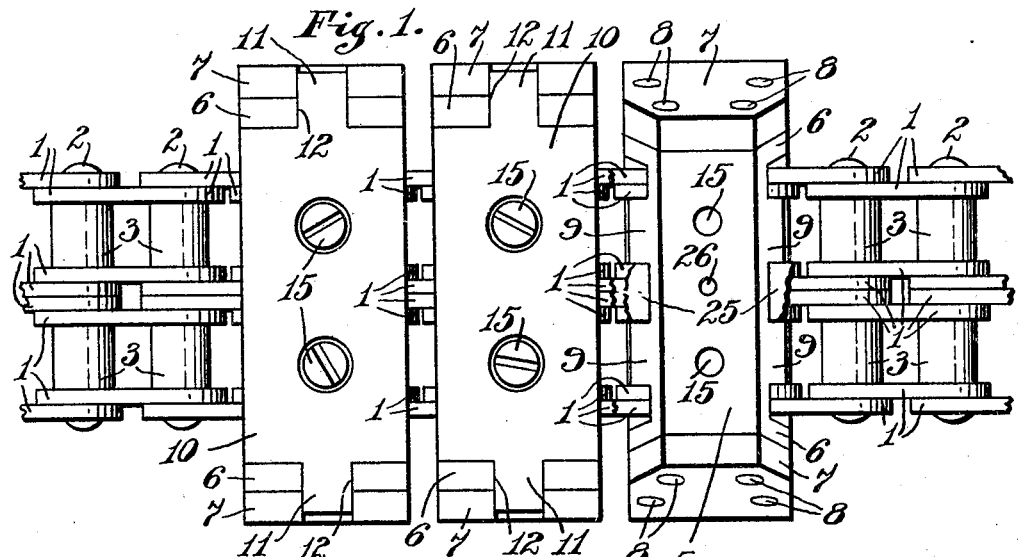
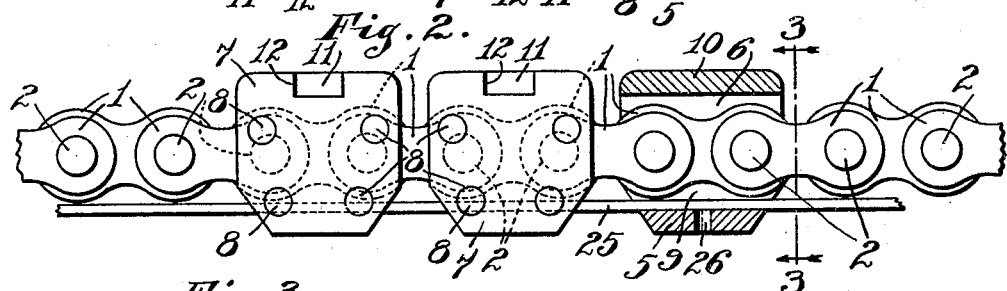
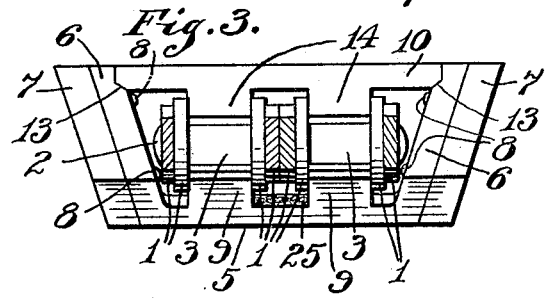
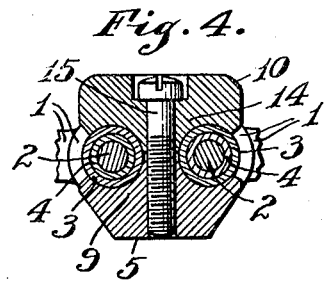
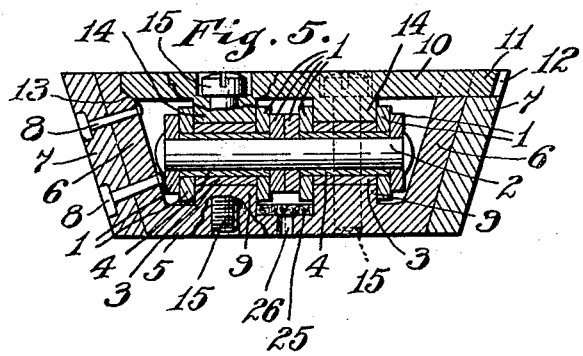
INVENTOR.
Paul B. Reeves,
BY
Hood + Hahn
ATTORNEYS Nov. 13, 1928.
P. B. REEVES
1,691,892
TRANSMISSION BELT
Filed March 5, 1926
2 Sheets-Sheet 2
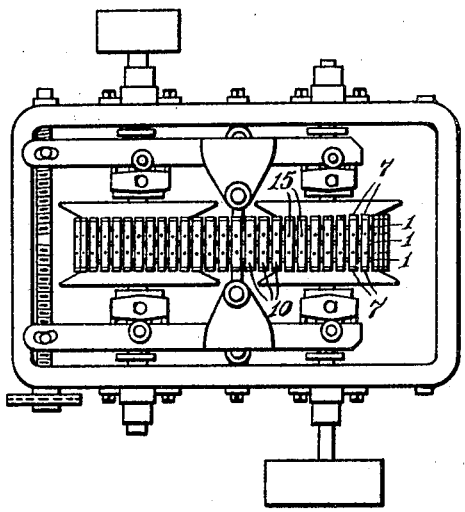
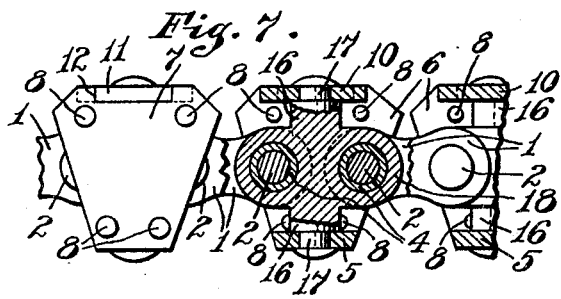
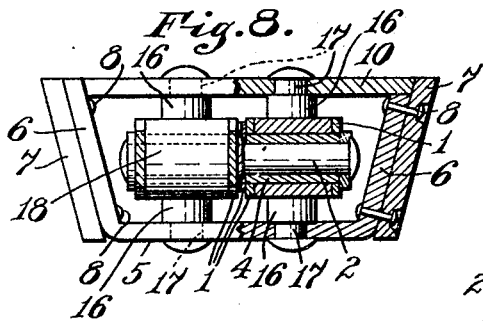
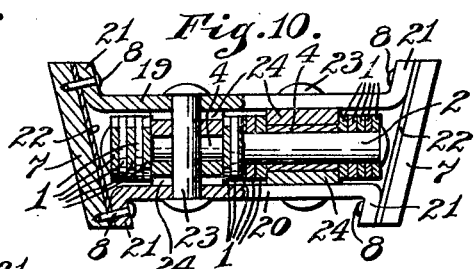
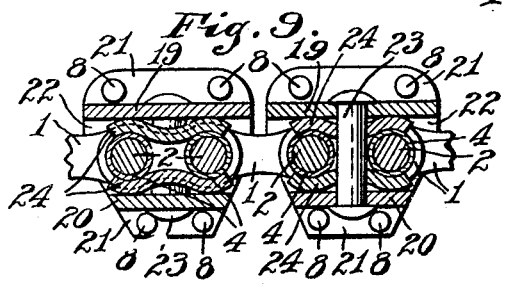
INVENTOR.
Paul B. Reeves,
BY
Hood + Hahn.
ATTORNEYS Patented Nov. 13, 1928.

1,691,892

UNITED STATES PATENT OFFICE.

PAUL B. REEVES, OF COLUMBUS, INDIANA, ASSIGNOR TO REEVES PULLEY COMPANY, OF COLUMBUS, INDIANA, A CORPORATION OF INDIANA.

TRANSMISSION BELT.

Application filed March 5, 1926. Serial No. 92,393.

My invention relates to an improved form of drive chain in which the power is delivered to and from the edge of the chain. It is particularly applicable for use as a driving chain in connection with that type of speed varying transmission commonly known in the market for many years as the "Reeves" transmission. In this form of transmission chain there is usually provided an endless flexible chain having secured through transverse bars provided with inclined faced ends and it is one of the objects of the present invention to provide an improved means for securing these transverse bars to the flexible endless chain.

For the purpose of disclosing my invention I have disclosed certain embodiments thereof in the accompanying drawings in which Fig. 1 is a top-bottom plan view of a portion of a drive chain embodying my invention;

Fig. 2 is a side elevation thereof partly in section;

Fig. 3 is a sectional view taken on the line 3—3 of Fig. 2;

Fig. 4 is a transverse section of one of the bars secured to the chain;

Fig. 5 is a longitudinal section of one of said bars;

Fig. 6 is a plan view of a "Reeves" transmission equipped with my improved belt;

Fig. 7 is a side elevation partly in section of a modified form of the improved belt;

Fig. 8 is an end view partly in section of the structure illustrated in Fig. 7;

Fig. 9 is a longitudinal sectional view of another form of belt embodying my invention, and Fig. 10 is an end view partly in section of the structure illustrated in Fig. 9.

In the structure illustrated, having now particular reference to that illustrated in Figs. 1 to 5, I provide an endless chain belt formed of a plurality of interdigitated transverse series of links 1 each of which is perfofated near its end to receive pivot or rocker pins 2. A link belt of this character and of the width sufficient for co-operation with the "Reeves" pulley type of transmission would ordinarily be of such weight as to be impractical and in order to obtain satisfactory results and at the same time reduce the weight of the belt, I arrange the links in the form of two edge series of links and a center series of links, the center series being spaced apart from the edge series by tubular spaces 3 surrounding tubular sleeves 4 on the pivot pins 2 and which receive certain of the links of the chain.

The transverse bars which are adapted to be secured to the chain above described are preferably cast from aluminum or some similar light metal and comprise the hollow bottom section 5 having inclined end walls 6 adapted to receive on their outer faces friction tips or end members 7 generally formed of leather. These tips 7 are secured to the end walls 6 by means of suitable rivets 8 passing through the end walls and through the tips. The bottom wall of the section 5 is provided with a pair of upwardly extending seat lugs 9 having their upper faces curved to coincide with the curvature of the spacers 3 and of sufficient transverse width to fit between the center and outer links. A top clamping member 10 is bridged between the end walls 6 having tongues 11 which take into slots 12 formed in the tops of the end walls. The ends of the top clamps 10 bear against the inner faces of the end walls 6 and fit into V shaped recesses 13 on the inner face of the end walls. This clamping member like the bottom section is provided with seat lugs 14 having their bottom faces curved to coincide with the spacers 3 on the chain and these seat lugs are similarly of such width as to fit between the center and side links. The two sections 5 and 10 are secured together and the seat lugs 9 and 14 clamped upon the spacers 3 by means of bolts or cap screws 15 passing through the top section 10 and into the bottom wall of the bottom section. When assembling the cross bars upon the chain the cap screws 15 are drawn up until the seat lugs securely clamp the top and bottom seat lugs upon the spacers 3. By this arrangement the transverse bars are securely held in position on the chain and at the same time the links of the chain are subjected to no clamping or distorting stress whereby the links will be perfectly free to move on their pivots.

In the structure illustrated in Figs. 7 and 8, for securing the cross bars in position, I provide for each cross bar a pair of studs 16 extending between the bottom section 5 and the top clamping section 10. These studs are provided at their ends with reduced portions or rivet studs 17 adapted to project through openings in the sections and be riveted down thereon, the reduced portion forming shoulders on which the top and bottom sections bear. These studs are provided with ears 18 adapted to surround the sleeves 4 on the pivot pins 2. In this structure as well as the structure illustrated in Figs. 1 to 4 it will be noted that the parts of the cross bars are clamped together and upon the chain there is no clamping strain on the links of the chain and these links accordingly are free to move on the pivot pins without obstruction or distortion.

In the structure illustrated in Figs. 9 and 10 the cross bars comprise a pair of transverse bridge members 19 and 20 having their ends upturned as at 21 to receive the friction tips 7, a spacer and bridge member 22 being interposed between the tips and the turned up portions 21 of the members 19 and 20 and spacing the gap between the two bridge members at their ends. The bridge members are clamped upon the chain by means of rivets 23 extending through the same and in order that the clamping stress may be taken off the chain links I interpose between the bridge members 19 and 20 spacers 24 which are adapted to rest on the sleeves 4 of the pivot pins 2. These spacers are preferably arched so as to coincide with the curvature of the sleeves and the rivets 23 pass through these spacers 24 to prevent lateral displacement thereof.

For lubricating the links of the structure illustrated in Figs. 1 to 5 and particularly the central links thereof, I provide an endless strip 25 of absorbent material such for instance as felt, which extends through the channel formed between the lugs on the bottom bridge member. A suitable oil opening 26 is formed in the bottom bridge member opposite the lubricating strip 25 so that the operator during the running of the belt may, by holding an oil can over the lubricating belt 25 deposit on the belt between the cross bars and through the opening 26 sufficient lubrication which will eventually find its way to the series of links.

I claim as my invention:

1. A drive belt comprising an endless series of pivotally connected links the pivotal bearing points of which are in axial alignment, two series of friction faces arranged in the edges of said belt, thrust receiving bridge members transversely spanning the tops and bottoms of said links and having the friction faces secured thereto and means independent of said links for directly securing said bridge members to the pivots of said links.

2. A drive belt comprising an endless series of pivotally connected links, the pivotal bearing points of which are in axial alignment, transversely extending bridge members directly clamped upon the pivot members of the links and friction faces vertically secured to the edges of said bridge members.

3. A drive belt comprising a series of spaced apart pressure members, friction faces secured at the opposite end of said members, a series of pivotally connected links, the pivotal bearing points of which are in axial alignment, passing between said spaced apart pressure members and means independent of the links for directly connecting the pressure members to the pivots of said links.

4. A drive belt comprising a series of interdigitated pivotally connected chain links, the pivotal bearing points of which are in axial alignment, top and bottom transversely extending bridge members directly clamped to the pivot members of said links and friction faces secured to the opposite ends of the bridge members.

5. A drive belt comprising an endless series of interdigitated links, pivot pins connecting said links, sleeves surrounding said pivot pins, a series of transversely extending bridge members clamped upon said sleeves and friction faces secured at the opposite ends of said bridge members.

6. A drive belt comprising a series of interdigitated chain links, pivot pins for connecting said links, sleeves surrounding said pivot pins, top and bottom transversely extending pressure bridge members having lugs bearing upon said sleeves, clamping means extending through said bridge members for clamping said lugs upon said sleeves and friction faces secured at the opposite ends of said bridge members.

7. A drive belt comprising a series of interdigitated pivotally connected chain links, sleeves surrounding the pivot members of said links, top and bottom transversely extending bridge members, the bottom bridge member having upwardly extending diverging side faces and the top bridge member being arranged between said side faces, both members having inwardly extending lugs bearing upon the sleeves of the pivot member and means for clamping said bridge members together.

8. A drive belt comprising a series of interdigitated pivotally connected links, a series of transversely extending pressure members each having upwardly extending diverging side faces, friction members secured to said side faces and upwardly projecting ears or lugs on the inner face of each pressure member connected to the pivots of the links.

In witness whereof, I, PAUL B. REEVES, have hereunto set my hand at Indianapolis, Indiana, this 2nd day of March, A. D. one thousand nine hundred and twenty-six.

PAUL B. REEVES.